(12) United States Patent
Yoshida (10) Patent No.: US 6,977,772 B2
(45) Date of Patent: Dec. 20, 2005

(54) DIRECT OPTICAL AMPLIFIER CORRELATING AVERAGE LEVEL OF MAIN SIGNAL WITH LEVEL OF PILOT TONE SIGNAL

(75) Inventor: Hideshi Yoshida, Tokyo (JP)

(73) Assignee: NEC Corporation, (JP)

( * ) Notice: Subject to any disclaimer, the term of this patent is extended or adjusted under 35 U.S.C. 154(b) by 228 days.

(21) Appl. No.: 10/619,478

(22) Filed: Jul. 16, 2003

(65) Prior Publication Data

US 2004/0013436 A1    Jan. 22, 2004

(30) Foreign Application Priority Data

Jul. 22, 2002  (JP)  ............................. 2002-212604

(51) Int. Cl.⁷ .......................... H01S 3/00; H04B 10/08
(52) U.S. Cl. .................................. 359/341.41; 398/32
(58) Field of Search ...................... 359/341.41; 398/32

(56) References Cited

U.S. PATENT DOCUMENTS

| | | | |
|---|---|---|---|
| 5,563,731 A * | 10/1996 | Asahi ..................... | 359/341.41 |
| 6,160,649 A * | 12/2000 | Horiuchi et al. ............... | 398/34 |
| 6,631,026 B2 * | 10/2003 | Kinoshita et al. ...... | 359/341.33 |
| 6,873,456 B2 * | 3/2005 | Motoshima et al. ... | 359/337.11 |
| 6,879,437 B2 * | 4/2005 | Sandell et al. .......... | 359/341.41 |
| 6,894,832 B1 * | 5/2005 | Aweya et al. .......... | 359/341.41 |
| 2003/0123140 A1 * | 7/2003 | Tanaka ................... | 359/341.41 |
| 2003/0161034 A1 * | 8/2003 | Nikaidou ................ | 359/341.41 |
| 2004/0218920 A1 * | 11/2004 | Piotte et al. ................... | 398/32 |

FOREIGN PATENT DOCUMENTS

| | | | |
|---|---|---|---|
| JP | 4-275530 | 10/1992 | ............. G02F 1/35 |
| JP | 2001-103013 | 4/2001 | .......... H04B 10/16 |
| JP | 2001-144692 | 5/2001 | .......... H04B 10/17 |
| JP | 2001-257646 | 9/2001 | .......... H04B 10/17 |

* cited by examiner

*Primary Examiner*—Jack Keith
*Assistant Examiner*—Deandra M. Hughes
(74) *Attorney, Agent, or Firm*—Dickstein, Shapiro, Morin & Oshinsky, LLP.

(57) ABSTRACT

The direct optical amplifier of the present invention monitors not only a pilot tone signal but also the main signal, and when the pilot tone signal loses relation to the main signal, re-establishes the relation between the level of the pilot tone signal and the average level of the main signal such that the pilot tone signal again functions as the reference light of the main signal. The average level of the true main signal from which a noise component has been eliminated is determined by means of a wavelength analyzer. The average level of the true main signal that has been determined is correlated with the level of a pilot tone signal that is monitored, whereby the pilot tone signal again functions as the reference light of the main signal. The monitored pilot tone signal is then controlled to obtain the desired average level of the true main signal.

4 Claims, 6 Drawing Sheets

DIRECT OPTICAL AMPLIFIER CORRELATING AVERAGE LEVEL OF MAIN SIGNAL WITH LEVEL OF PILOT TONE SIGNAL

BACKGROUND OF THE INVENTION

1. Field of the Invention

The present invention relates to a direct optical amplifier in a wavelength Division Multiplexing (WDM) optical transmission system.

2. Description of the Related Art

In a WDM optical transmission system, the control of the main signal to a fixed level is a key issue. A first solution that can be considered for controlling the level of the main signal to a fixed level involves monitoring the level of the main signal itself and then controlling this signal to a fixed level (as disclosed in, for example, Japanese Patent Laid-Open Publication No. 103013/01 and Japanese Patent Laid-Open Publication No. 144692/01).

However, the modulating frequency of the main signal is high and the main signal therefore tends to be easily affected by noise. Using a main signal directly for control complicates the achievement of a fixed output control in which the main signal is stable.

However, new methods have been invented (for example, Japanese Patent Laid-Open Publication No. 275530/92 and Japanese Patent Laid-Open Publication No. 257646/01) for maintaining the output of a main signal at a fixed level by controlling an optical signal (a pilot tone signal) to a fixed level, this optical signal having a wavelength that differs from the wavelength of the main signal, and moreover, having a level that is equal to the average level of the main signal, which has a plurality of channels.

The pilot tone signal that is used in these methods has a modulating frequency that is significantly lower than the modulating frequency of the main signal. The pilot signal is therefore relatively impervious to influence from noise and can therefore provide fixed output control of a main signal that is more stable than in a method of directly employing the main signal for control.

Nevertheless, in the pilot tone signal uniform control, control is realized by taking the level of the pilot tone signal as equal to the average level of the main signal and then monitoring only the pilot tone signal. Thus, when the gain of a direct optical amplifier is dependent on wavelength, there is the danger that the pilot tone signal will lose its meaning as the reference light of the main signal. In other words, control is effected on the assumption that the level of the pilot tone signal is equal to the average level of the main signal. However, since the pilot tone signal and the main signal have different wavelengths, the dependency in the gain of the direct optical amplifier on wavelength will result in divergence of the level of the pilot tone signal and the average level of the main signal, which otherwise should be equal, and the pilot tone signal can no longer function as the reference light to control the main signal to a fixed output.

When the pilot tone signal no longer functions as the reference light for fixed output control of the main signal as described above, it should be clear that the main signal cannot be controlled to a fixed level even if the pilot tone signal is blindly controlled to a fixed level. On the contrary, there is the danger that the average level of the main signal, which is supposed to be equal to the level of the pilot tone signal, will go out of control and rise to excessive highs or fall to excessive lows. Excessive increases in the output level result in the occurrence of nonlinearity in the transmission optical fiber, and excessive drops in the output level result in the deterioration of the S/N ratio.

Figure 1A:
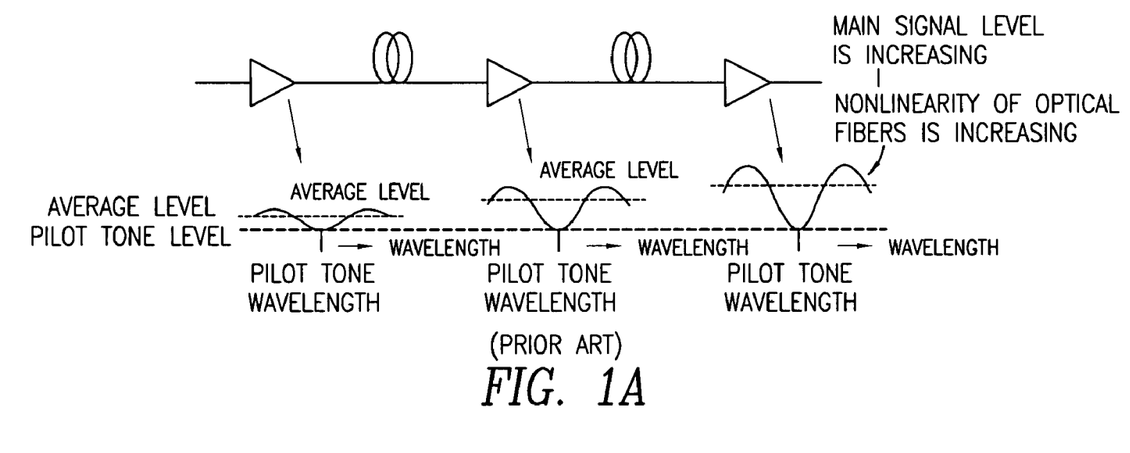
FIG. 1A shows a defect in the prior art (a case in which the average level of the main signal becomes excessively higher than the level of the pilot tone signal)
Figure 1B:
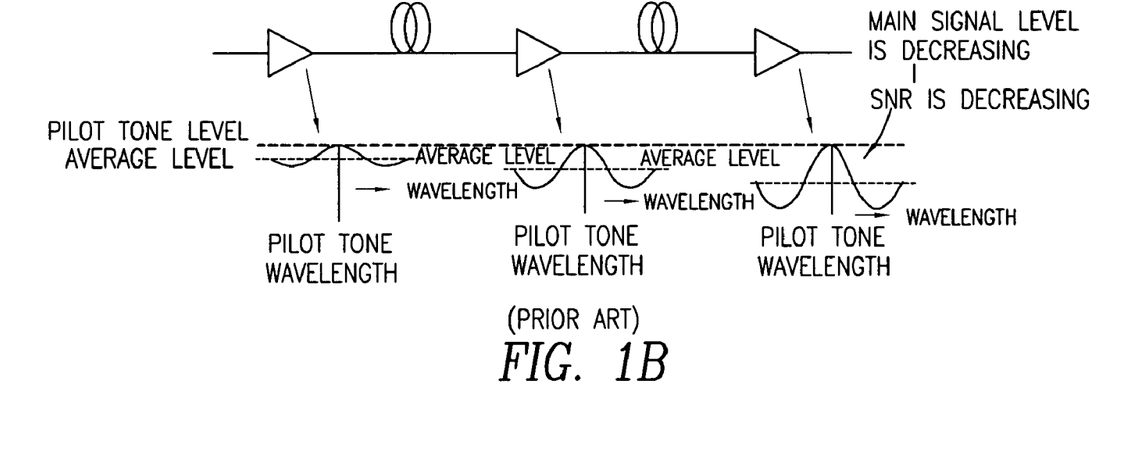
FIG. 1B shows a defect in the prior art (a case in which the average level of the main signal becomes excessively lower than the level of the pilot tone signal)

We next refer to FIGS. 1A and 1B, which present schematic views of this problem. FIG. 1A shows a case in which the average level of the main signal rises excessively over the level of the pilot tone signal, and FIG. 1B shows a case in which the average level of the main signal falls excessively from the level of the pilot tone signal. For the sake of simplifying the explanation, the three direct optical amplifiers in both FIGS. 1A and 1B are assumed to have the same gain characteristics.

In FIG. 1A, the net gain of the main signal is greater than the net gain of the pilot tone signal (Since the pilot tone signal is controlled to a fixed level, the gain and loss of the direct optical amplifier in the wavelength of the pilot tone signal are in balance, the net gain is 0, and the output is fixed), and the average level of the main signal, which should have been equal to the pilot tone signal level, becomes progressively greater as a result of relay transmission.

In FIG. 1B, in contrast, the net gain of the main signal is smaller than the net gain of the pilot tone signal, and the average level of the main signal, which should be equal to the level of the pilot tone signal, therefore becomes progressively smaller as a result of relay transmission.

Although the gain can be leveled by means of a multi-relay connection scheme in which a plurality of sets of direct optical amplifiers having different gain characteristics are combined, this scheme could not be considered a real solution to the problem.

SUMMARY OF THE INVENTION

It is an object of the present invention to provide a direct optical amplifier that can reliably prevent the average level of the main signal from becoming excessively high or excessively low while effecting control over the main signal by pilot tone fixed control in a WDM optical transmission system.

To achieve the above-described objects, the direct optical amplifier of the present invention monitors not only the pilot tone signal but also the main signal and reestablishes the correlation between the level of the pilot tone signal and the average level of the main signal when these two levels have lost correlation, and thus enables the pilot tone signal to again function as the reference light.

The true average level of the main signal is determined by using a wavelength analyzer to eliminate the noise component. The obtained true average level of the main signal is correlated with the level of the pilot tone signal that is being monitored. In this way, the pilot tone signal can again function as the reference light of the main signal. The monitored pilot tone signal is controlled to obtain the desired average level of the true main signal.

As described in the foregoing explanation, the present invention allows constant control to a fixed value or to within a fixed range without the average level of the main signal rising and falling excessively even if the gain of a direct optical amplifier is dependent on wavelength.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 2A:
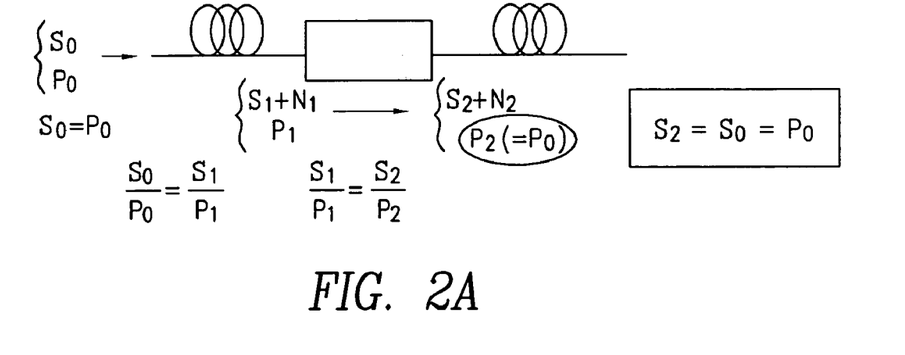
FIG. 2A shows a model for explaining the direct optical amplifier of the present invention in comparison with a direct optical amplifier of the prior art (a model in which the dependency in the gain of a direct optical amplifier on wavelength is not taken into consideration in the direct optical amplifier of the prior art)
Figure 2B:
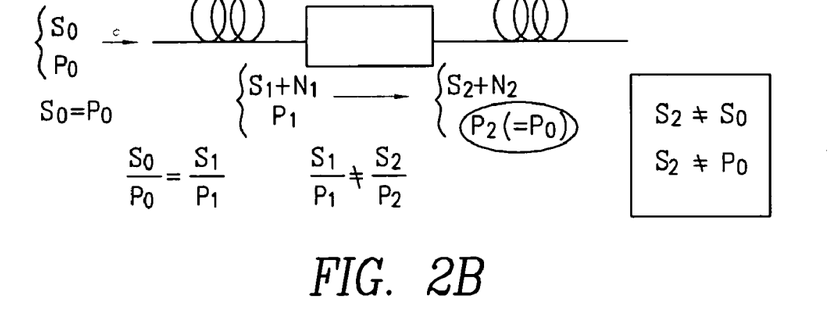
FIG. 2B shows a model for explaining the direct optical amplifier of the present invention in comparison with a direct optical amplifier of the prior art (a model in which the dependency in the gain of a direct optical amplifier on wavelength has been taken into consideration in the direct optical amplifier of the prior art)
Figure 2C:
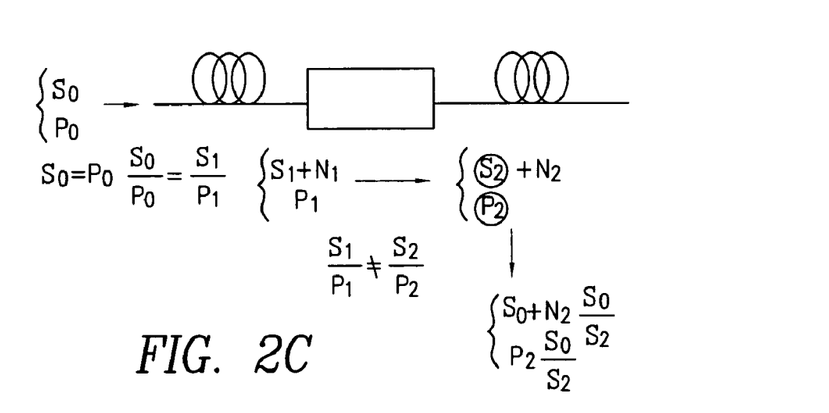
FIG. 2C shows a model for explaining a direct optical amplifier of the present invention in comparison with a direct optical amplifier of the prior art (a model in which the dependency in the gain of a direct optical amplifier on wavelength has been taken into consideration in the direct optical amplifier of the present invention)

We first refer to FIGS. 2A, 2B, and 2C, in which are shown models for describing the direct optical amplifier of the present invention in comparison with a direct optical amplifier of the prior art. These models are based on several assumptions. First, loss dispersion of the optical fiber is ignored. In other words, the losses in the wavelength of the main signal and in the wavelength of the pilot tone signal are assumed to be equal. Second, noise caused by optical fiber transmission is considered only in the main signal. The modulating frequency of the pilot tone signal is much lower than the modulating frequency of the main signal, and the influence of noise in the pilot tone signal is therefore considered negligible.

In each of the figures, S0 indicates the main signal at the incident end, S1 indicates the attenuated main signal immediately before incidence to the direct optical amplifier, and S2 indicates the main signal immediately following amplification by the direct optical amplifier, respectively. Similarly, P0 indicates the pilot tone signal at the incident end, P1 indicates the attenuated pilot tone signal immediately before incidence to the direct optical amplifier, and P2 indicates the pilot tone signal immediately following amplification by the direct optical amplifier. N1 is the noise of the main signal immediately before incidence to the direct optical amplifier, and N2 is the noise of the main signal immediately after amplification by the direct optical amplifier. On the incident end, it is assumed that S0=P0. Since the loss dispersion of the optical fiber is ignored, S0/P0=S1/P1.

Referring now to FIG. 2A, a model is shown in which the dependency in the gain of the direct optical amplifier on wavelength is not taken into consideration in the direct optical amplifier of the prior art. Since the dependency in the gain of the direct optical amplifier on wavelength is not considered, S1/P1=S2/P2, and accordingly, S2/P2=S0/P0. Because the pilot tone signal is controlled to a fixed level in the direct optical amplifier, P2=P0, and accordingly, S2=S0=P0. In other words, if the dependency in the gain of the direct optical amplifier on wavelength is not taken into consideration, the main signal is kept at a fixed level, and moreover, the levels of the main signal and the pilot tone signal remain matched.

We next refer to FIG. 2B, which shows a model in which the dependency in the gain of the direct optical amplifier on wavelength is taken into consideration in a direct optical amplifier of the prior art. Because the dependency in the gain of the direct optical amplifier on wavelength is taken into consideration, S1/P1 and S2/P2 are not equal, and accordingly, S2/P2 and S0/P0 are also not equal. Since the pilot tone signal is controlled to a fixed level in the direct optical amplifier, P2=P0, but since S2/P2 and S0/P0 are not equal, neither S2 and S0 nor S2 and P0 are equal. In other words, when the dependency in the gain of the direct optical amplifier on wavelength is taken into consideration, the main signal is not maintained at a fixed level, and moreover, the levels of the main signal and the pilot tone signal do not match. Further, if only the pilot tone signal is monitored, the correlation of the level of the main signal and the level of the pilot tone signal is lost, and the continued control of the pilot tone signal to a fixed level therefore has no significance with regard to maintaining the main signal at a fixed level.

We next refer to FIG. 2C, which shows a model for a case in which the dependency in the gain of the direct optical amplifier on wavelength has been taken into consideration in a direct optical amplifier of the present invention. Since the dependency in the gain of the direct optical amplifier on wavelength is taken into consideration, S1/P1 and S2/P2 are not equal, and accordingly, S2/P2 and S0/P0 are not equal, either.

However, in the direct optical amplifier of the present invention, the pilot tone signal is not controlled to a fixed level by monitoring only the pilot tone signal. The true main signal S2 from which noise N2 has been eliminated is determined by the use of a wavelength analyzer and a correlation is established between the pilot tone signal P2 and the true main signal S2. The establishment of this correlation restores the function of the pilot tone signal as the reference light of the main signal. For example, in order to control main signal S2 to become S0, pilot tone signal P2 should be controlled to become P2S0/S2.

A wavelength analyzer is used to eliminate noise N2 to obtain true main signal S2 because the high frequency modulation of the main signal tends to multiply the noise component, and if the main signal that still contains the noise component is controlled to a fixed level, a loss of the true main signal component will occur with each relay.

Figure 3:
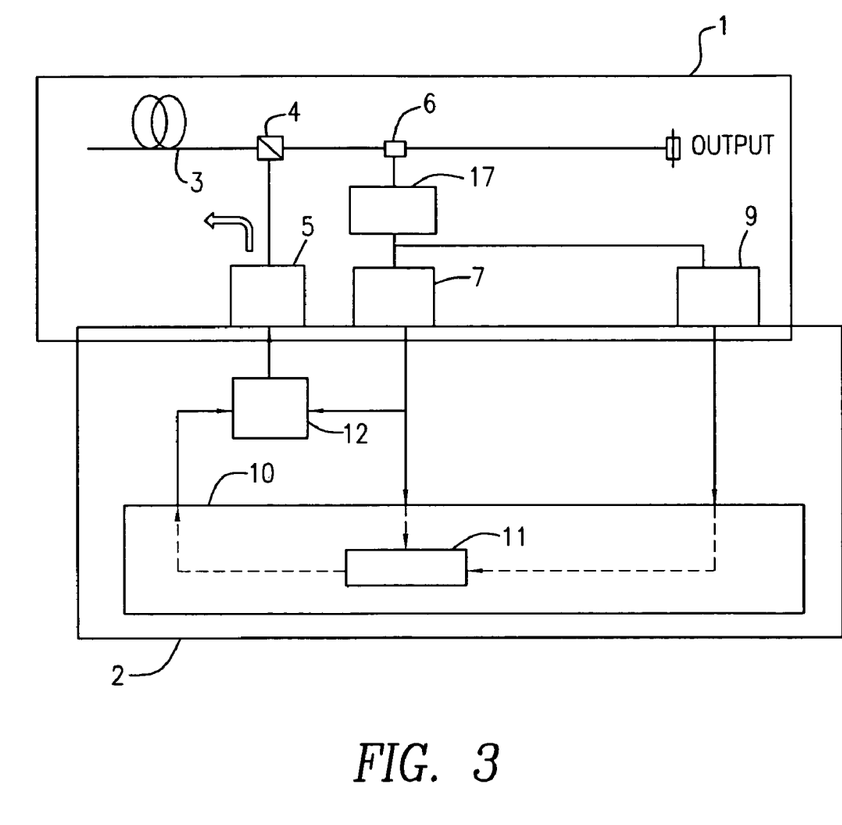
FIG. 3 is a block diagram showing the direct optical amplifier of the first embodiment of the present invention.

Referring now to FIG. 3, the direct optical amplifier of the first embodiment of the present invention includes optical module 1 for amplifying an optical signal and electronic control unit 2 for controlling optical module 1.

Optical module 1 includes: erbium-doped optical fiber (EDF) 3, which is the medium of the direct optical amplifier; pumping laser diode (LD) 5 for generating pumping light; WDM coupler 4 for injecting the pumping light from pumping LD 5 into EDF 3; branch coupler 6 for monitoring the main signal and pilot tone signal that are thought to be supplied from the output port; wavelength analyzer 17 (for example, optical spectrum analyzer available commercially); pilot tone signal monitor 7 for monitoring the pilot tone signal that is analyzed at wavelength analyzer 17; and main signal monitor 9 for monitoring the average level of the true main signal from which noise has been eliminated at wavelength analyzer 17.

Electronic control unit 2 includes: operation processor 10 that includes comparison operation processor 11 for determining the target value of the pilot tone signal level in pumping LD 5 based on the output from pilot tone signal monitor 7 and the output from main signal monitor 9; and LD control unit 12 for controlling pumping LD5 such that the pilot tone signal that is monitored by pilot tone signal monitor 7 matches the target value of the pilot tone signal that is determined by comparison operation processor 11.

Pilot tone signal monitor 7 supplies the level of the monitored pilot tone signal to comparison operation processor 11; and main signal monitor 9 supplies the average level of the true main signal from which the noise component has been eliminated to comparison operation processor 11. Comparison operation processor 11 finds the multiple of the average level of the true main signal to the pilot tone signal. By determining this multiple, the function of the pilot tone signal as the reference light of the main signal is recovered, and the use of the pilot tone signal in main signal control regains significance. The pilot tone signal level is determined that corresponds to the desired average level of a true main signal that is to be maintained at a fixed level, and this pilot tone signal level is supplied to LD control unit 12 as the target value of control. LD control unit 12 realizes control such that the level of the pilot tone signal that is monitored by pilot tone signal monitor 7 becomes this target value.

Figure 4:
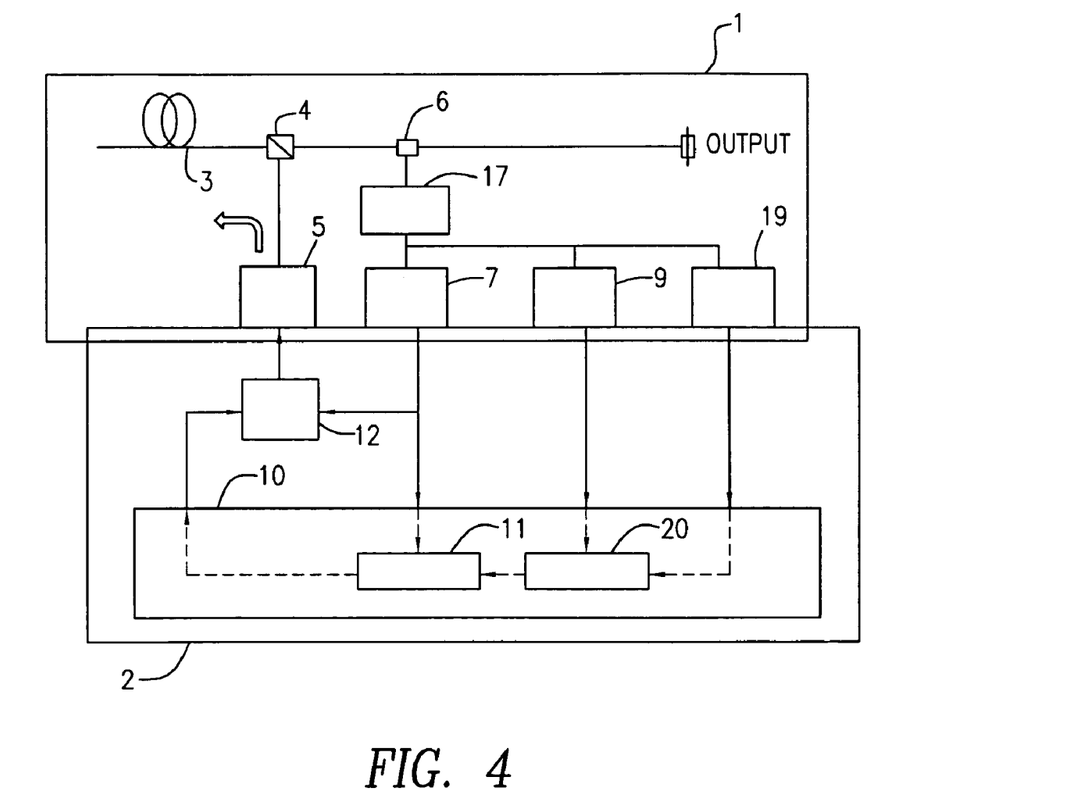
FIG. 4 is a block diagram showing the direct optical amplifier of the second embodiment of the present invention.

We next refer to FIG. 4, which shows the direct optical amplifier of the second embodiment of the present invention. In this embodiment, ASE monitor 19 for monitoring Amplified Spontaneous Emission (ASE) light that is contained in the output light and subtraction processor 20 are additionally provided in the direct optical amplifier of the first embodiment of FIG. 3.

The average level of the main signal that is monitored by main signal monitor 9 includes an ASE light component, and controlling this average level of the main signal and ASE light component as the average level of the main signal results in incremental loss of the average level of the true main signal with each repeated relay, similar to the case for noise. However, the ASE light level that is included in the output light is monitored by ASE monitor 19, and the difference between the ASE light level and the average level of the main signal that is monitored by main signal monitor 9 is determined in subtraction processor 20 in operation processor 10 to obtain the average level of the true main signal from which the ASE light has been eliminated. ASE light is spontaneously emitted light and therefore has a broad spectrum and can be measured separately from the level of the main signal. Subsequent processing is carried out similarly to the first embodiment. The present embodiment can be expected to have the effect of suppressing the drop in the output level of the main signal that occurs when a main signal that includes a large ASE light component is subjected to optical amplification.

Figure 5:
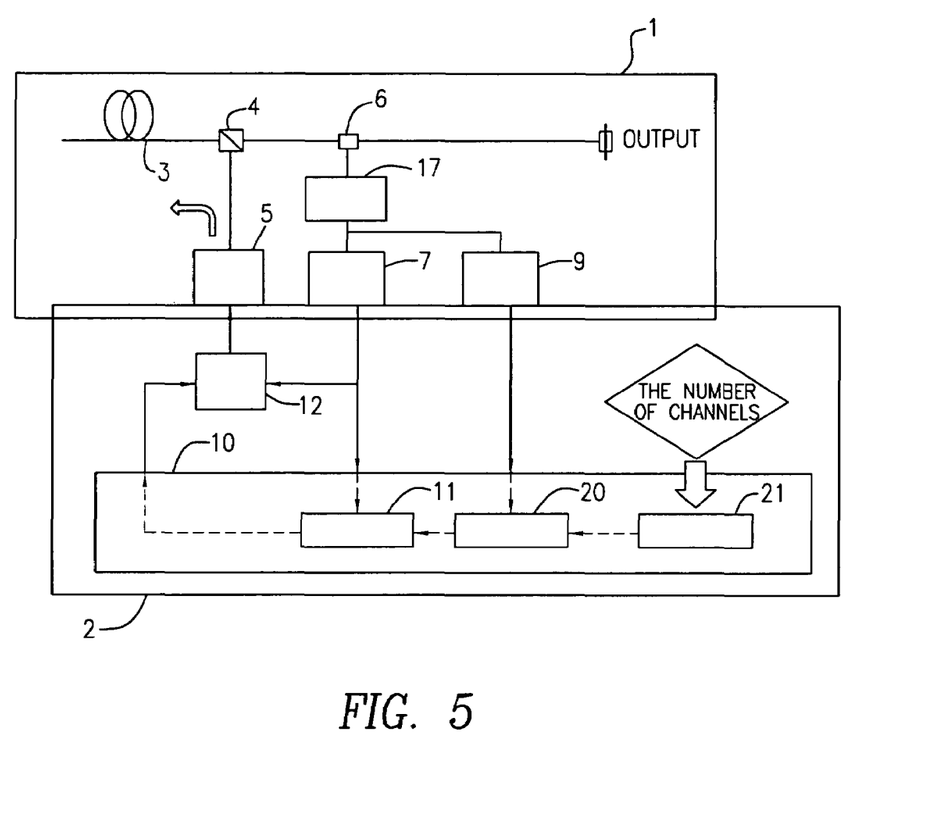
FIG. 5 is a block diagram showing the direct optical amplifier of the third embodiment of the present invention.

We next refer to FIG. 5, which shows the direct optical amplifier of the third embodiment of the present invention. In this embodiment, ASE monitor 19 in the second embodiment has been replaced with ASE data memory 21. ASE light levels are measured in advance for each number of channels of the main signal, and these levels are then stored in ASE data memory 21. The measurement of ASE light levels is realized by measuring output light when a direct optical amplifier is operated in a no-signal state. Data on the number of channels are supplied as input to operation processor 10 by external input, and data on ASE light levels that correspond to the data on the number of channels are read from ASE data memory 21. Subsequent processing is carried out as in the direct optical amplifier of the second embodiment. The present embodiment obviates ASE monitor 19 and therefore can be expected to have the effect of both enabling a more compact control system and lowering the cost of the amplifier.

Figure 6:
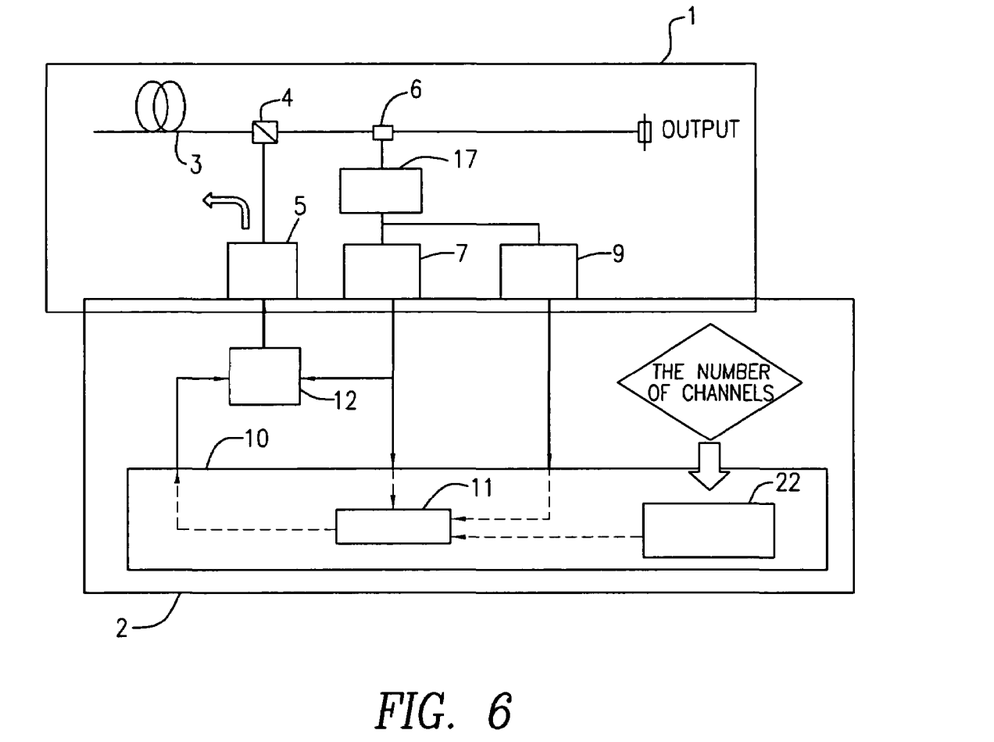
FIG. 6 is a block diagram of the direct optical amplifier of the fourth embodiment of the present invention.

We next refer to FIG. 6, which shows a direct optical amplifier of the fourth embodiment of the present invention. In this embodiment, main signal limit memory 22 is provided for storing the maximum values and minimum values of the average levels of the main signal. Channel number data for the main signal are entered by external input to operation processor 10, and data regarding the limits (the maximum values and the minimum values) of the average levels of the main signal that correspond to the channel number data are read from main signal limit memory 22. When the actual average level of the main signal that is monitored by main signal monitor 9 is higher than the maximum value that is stored in main signal limit memory 22, control is realized using the pilot tone signal level that corresponds to this maximum value as the target value. When the actual average level of the main signal that is monitored by main signal monitor 9 is lower than the minimum value that is stored in main signal limit memory 22, control is realized using a pilot tone signal level that corresponds to this minimum value as the target value. When the average level of the actual main signal is higher than the minimum value that is stored in main signal limit memory 22 and lower than the maximum value that is stored in main signal limit memory 22, control is not effected and the light is supplied as output as it is.

While preferred embodiments of the present invention have been described using specific terms, such description is for illustrative purposes only, and it is to be understood that changes and variations may be made without departing from the spirit or scope of the following claims.

What is claimed is:

1. A direct optical amplifier for establishing a correlation between the average level of a main signal having a plurality of channels and the level of a pilot tone signal for controlling the average level of said main signal to a desired level, said direct optical amplifier comprising:

optical amplification means for amplifying the main signal and the pilot tone signal;

pumping light generation means for generating pumping light that optically pumps said optical amplification means;

wavelength analysis means for analyzing the spectral intensity of an optical transmission signal that includes the main signal and the pilot tone signal and extracting the level of the pilot tone signal and the average level of the main signal from which a noise component has been eliminated;

pilot tone signal monitor means for monitoring the level of the pilot tone signal that has been extracted by said wavelength analysis means;

main signal monitor means for monitoring the average level of the main signal from which a noise component has been eliminated and which has been extracted by said wavelength analysis means;

processing means for establishing a correlation between the level of the pilot tone signal that is monitored by said pilot tone signal monitor means and the average level of the main signal from which the noise component has been eliminated and which is monitored by said main signal monitor means, determining the level of the pilot tone signal that corresponds to a desired average level of the main signal from which the noise component has been eliminated; and taking this pilot tone signal level as a target level; and pumping light control means for controlling the intensity of the pumping light that is generated by said pumping light generation means and adjusting the amplification factor of said optical amplification means such that the level of the pilot tone signal that is monitored by said pilot tone signal monitor means becomes said target level that is determined at said processing means.

2. A direct optical amplifier for establishing a correlation between the average level of a main signal having a plurality of channels and the level of a pilot tone signal for controlling the average level of said main signal to a desired level, said direct optical amplifier comprising:

optical amplification means for amplifying the main signal and the pilot tone signal;

pumping light generation means for generating pumping light that optically pumps said optical amplification means;

wavelength analysis means for analyzing the spectral intensity of an optical transmission signal that includes the main signal and the pilot tone signal and extracting the level of the pilot tone signal, the average level of the main signal from which a noise component has been eliminated, and the level of amplified spontaneous emission light that is contained in the main signal;

pilot tone signal monitor means for monitoring the level of the pilot tone signal that has been extracted by said wavelength analysis means;

main signal monitor means for monitoring the average level of the main signal from which a noise component has been eliminated and which has been extracted by said wavelength analysis means;

ASE monitor means for monitoring the level of the amplified spontaneous emission light that is contained in the main signal and that has been extracted by said wavelength analysis means;

processing means for establishing a correlation between the level of the pilot tone signal that is monitored by said pilot tone signal monitor means and a level that is obtained by subtracting the level of the amplified spontaneous emission light that is contained in the main signal and that is monitored by said ASE monitor means from the average level of the main signal from which a noise component has been eliminated and which is monitored by said main signal monitor means, determining the level of the pilot tone signal that corresponds to a desired average level of the main signal from which a noise component and an amplified spontaneous emission light component have been eliminated; and taking this pilot tone signal level as a target level; and pumping light control means for controlling the intensity of the pumping light that is generated by said pumping light generation means and adjusting the amplification factor of said optical amplification means such that the level of the pilot tone signal that is monitored by said pilot tone signal monitor means becomes said target level that is determined by said processing means.

3. A direct optical amplifier for establishing a correlation between the average level of a main signal having a plurality of channels and the level of a pilot tone signal for controlling the average level of said main signal to a desired level, said direct optical amplifier comprising:

optical amplification means for amplifying the main signal and the pilot tone signal;

pumping light generation means for generating pumping light that optically pumps said optical amplification means;

wavelength analysis means for analyzing the spectral intensity of an optical transmission signal that includes the main signal and the pilot tone signal and extracting the level of the pilot tone signal and the average level of the main signal from which a noise component has been eliminated;

pilot tone signal monitor means for monitoring the level of the pilot tone signal that has been extracted by said wavelength analysis means;

main signal monitor means for monitoring the average level of the main signal from which a noise component has been eliminated and which has been extracted by said wavelength analysis means;

ASE data memory means for storing the level of amplified spontaneous emission light that is contained in the main signal and that has been measured in advance for each number of channels of the main signal and supplying as output the value of the level of the amplified spontaneous emission light that corresponds to the number of channels that is supplied as input;

processing means for establishing a correlation between the level of the pilot tone signal that is monitored by said pilot tone signal monitor means and a level that is obtained by subtracting the level of the amplified spontaneous emission light that is contained in the main signal and that has been supplied as output by said ASE data memory means from the average level of the main signal from which a noise component has been eliminated and which is monitored by said main signal monitor means, determining the level of the pilot tone signal that corresponds to a desired average level of the main signal from which a noise component and an amplified spontaneous emission light component have been eliminated; and taking this pilot tone signal level as a target level; and pumping light control means for controlling the intensity of the pumping light that is generated by said pumping light generation means and adjusting the amplification factor of said optical amplification means such that the level of the pilot tone signal that is monitored by said pilot tone signal monitor means becomes said target level that is determined by said processing means.

4. A direct optical amplifier for establishing a correlation between the average level of a main signal having a plurality of channels and the level of a pilot tone signal for controlling the average level of said main signal to a level in a desired range, said direct optical amplifier comprising:

optical amplification means for amplifying the main signal and the pilot tone signal;

pumping light generation means for generating pumping light that optically pumps said optical amplification means;

wavelength analysis means for analyzing the spectral intensity of an optical transmission signal that includes the main signal and the pilot tone signal and extracting the level of the pilot tone signal and the average level of the main signal from which a noise component has been eliminated;

pilot tone signal monitor means for monitoring the level of the pilot tone signal that has been extracted by said wavelength analysis means;

main signal monitor means for monitoring the average level of the main signal from which the noise component has been eliminated and which has been extracted by said wavelength analysis means;

main signal limit memory means for storing the maximum levels and minimum levels of the average levels of the main signal that have been determined in advance for each number of channels of the main signal, and for supplying as output the values of the maximum level and minimum level that correspond to the number of channels that is supplied as input;

processing means for establishing a correlation between the level of the pilot tone signal that is monitored by said pilot tone signal monitor means and the average level of the main signal from which the noise component has been eliminated and which is monitored by said main signal monitor means; determining the level of the pilot tone signal that corresponds to the average level of the main signal from which the noise component has been eliminated and which is monitored by said main signal monitor means and making this level of the pilot tone signal the target level when the average level of the main signal from which the noise component has been eliminated is between said maximum level and said minimum level that have been supplied as output by said main signal limit memory means; determining the level of the pilot tone signal that corresponds to said maximum level and making this level of the pilot tone signal the target level when the average level of the main signal from which the noise component has been eliminated exceeds said maximum level that has been supplied as output by said main signal limit memory means; and determining the level of the pilot tone signal that corresponds to said minimum level and making this level of the pilot tone signal the target level when the average level of the main signal from which the noise component has been eliminated is below said minimum level that has been supplied as output by said main signal limit memory means; and pumping light control means for controlling the intensity of the pumping light that is generated by said pumping light generation means and adjusting the amplification factor of said optical amplification means such that the level of the pilot tone signal that is monitored by said pilot tone signal monitor means becomes said target level that is determined by said processing means.

* * * * *